United States Patent [19]

Murray

[11] Patent Number: 5,060,487
[45] Date of Patent: Oct. 29, 1991

[54] ABSORPTION REFRIGERATION SYSTEM PURGE PUMP APPARATUS

[75] Inventor: Joseph G. Murray, Worthington, Ohio

[73] Assignee: Gas Research Institute, Chicago, Ill.

[21] Appl. No.: 687,042

[22] Filed: Apr. 18, 1991

[51] Int. Cl.$^5$ ............................................. F25B 43/04
[52] U.S. Cl. ......................................... 62/475; 62/85; 62/476
[58] Field of Search ............................ 62/85, 475, 476

[56]  References Cited

U.S. PATENT DOCUMENTS

| Re. 23,093 | 3/1949 | Roswell | 62/475 |
|---|---|---|---|
| 2,353,859 | 7/1944 | Thomas | 62/475 |
| 2,363,381 | 11/1944 | Anderson, Jr. | 62/475 |
| 2,367,708 | 1/1945 | Anderson, Jr. | 62/475 |
| 2,374,521 | 4/1945 | Anderson, Jr. | 62/475 |
| 2,384,860 | 9/1945 | Thomas | 62/475 |
| 2,384,861 | 9/1945 | Roswell | 62/475 |
| 2,400,138 | 5/1946 | Buffington | 62/475 |
| 2,432,978 | 12/1947 | Anderson, Jr. | 62/475 |
| 2,510,730 | 6/1950 | Whitlow | 62/475 |
| 2,510,737 | 6/1950 | Buffington | 62/475 |
| 3,131,546 | 5/1964 | Osborne | 62/475 |
| 3,309,894 | 3/1967 | Tamada | 62/475 |
| 3,360,950 | 1/1968 | Osborne | 62/475 |
| 3,367,135 | 2/1968 | Greacen et al. | 62/475 |
| 4,343,159 | 8/1982 | Vardi et al. | 62/475 |
| 4,467,623 | 8/1984 | Reimann | 62/475 |
| 4,531,375 | 8/1985 | Zinsmeyer | 62/85 |

Primary Examiner—Lloyd L. King
Attorney, Agent, or Firm—Watkins, Dunbar & Pollick

[57]  ABSTRACT

An absorption refrigeration system having absorber and generator elements and a solution pump flowing relatively dilute refrigeration solution from a system absorber sub-atmospheric operating pressure to a system generator operating pressure is provided with novel low-pressure-differential, positive-displacement purge pump apparatus that is driven by bleed relatively dilute refrigeration solution taken from the solution pump high-pressure side, flowed through a coiled tube flow restrictor device to substantially reduce bleed solution operating pressure, and then through an inverted vertical U-tube that includes a V-shaped entrapment zone that receives un-wanted, non-condensed gases purged from the system absorber element. The entrapped un-wanted gases are composed by gravitational forces and then flowed through the system solution pump to the generator element for re-separation and for subsequent accumulation and venting to the atmosphere without requiring system shut-down for purging purposes or the use of a separate mechanical vacuum pump.

4 Claims, 2 Drawing Sheets

ABSORPTION REFRIGERATION SYSTEM PURGE PUMP APPARATUS

FIELD OF THE INVENTION

This invention relates generally to absorption refrigeration systems, and particularly concerns pumping apparatus for purging so-called non-condensible gases from the refrigeration system absorber element at low pressure differentials and using a positive displacement principle without requiring apparatus moving parts.

CROSS REFERENCE

None.

BACKGROUND OF THE INVENTION

It is common practice in the design, manufacture, and operation of known absorption refrigeration system arrangements to provide for the purging of so-called non-condensible gases from the system absorber element to the atmosphere. Many of such known systems separate the unwanted non-condensible gases from the apparatus vaporized refrigerant (usually water vapor) at pressures very nearly equal to the system absorber element sub-atmospheric operating pressure, store the separated gases in an appropriate vessel at or near the separation pressure, and then subsequently periodically or continuously operate an included exhaust vacuum pump to vent the collected and unwanted gases to the atmosphere using vacuum pump discharge pressures greater than atmospheric pressure. An example of such systems is the absorption refrigeration system disclosed by U.S. Pat. No. 2,384,861 issued in the name of Roswell and assigned to Servel, Inc. of New York, N.Y. Other patents assigned to Servel, Inc. and disclosing similar absorption refrigeration apparatus include U.S. Pat. Nos. 2,363,381; 2,367,708 and 2,432,978 issued in the name of Anderson, Jr., U.S. Pat. No. 2,384,860 issued in the name of Thomas, U.S. Pat. No. 2,510,730 issued in the name of Whitlow, and U.S. Pat. No. 2,510,737 issued in the name of Buffington.

Other known absorption refrigeration systems utilize a refrigeration solution pump that pumps relatively weak or dilute absorption refrigeration solution and entrained non-condensible gases from the apparatus absorber low-pressure side to the apparatus generator high pressure side and require that the purging operation be periodically shut down, as in the case of U.S. Pat. No. 4,467,623 to Reimann, if separated and accumulated unwanted, non-condensible gases are to be vented to the atmosphere at system high-side pressures. See also, in this regard, U.S. Pat. No. 3,360,950 issued to Osborne and U.S. Pat. No. 3,367,135 issued in the names of Greacen et al.

I have discovered that various changes may be made in the construction and operation of a sub-atmospheric absorption refrigeration system to permit the purging of unwanted, non-condensible gases from the system to the atmosphere without having to pump the separated gases as by a separate vacuum purge pump having a discharge pressure above ambient atmospheric pressure, either with such pump being incorporated permanently into the system or being used only when specially connected to the system intermittently as by a service mechanic during the course of a service call. Also, the purge system of this invention may be made to operate either fully automatically or in response to manual control inputs without requiring that operation of the refrigeration system in any respect be inactivated in order to permit the venting of accumulated non-condensible gases to the atmosphere using inherently present system operating pressures which are greater than atmospheric pressure.

SUMMARY OF THE INVENTION

The purge system of this invention has application to sub-atmospheric absorption refrigeration apparatus of the type using a lithium bromide and water refrigeration solution pair and having conventional evaporator, absorber, generator, and condenser elements with dilute refrigeration solution being pumped from the apparatus absorber low-pressure side to the apparatus generator high-pressure side by a conventional refrigeration solution pump. A purge tube having an inlet appropriately positioned in the apparatus absorber chamber conducts any unwanted non-condensible gases present in the absorber chamber, together with any excess refrigerant water vapor present, to a novel pump apparatus which receives such gases for low-pressure differential pumping and which is driven by a bleed fraction of the dilute refrigeration solution otherwise flowed to the apparatus generator element. The driving bleed fraction of dilute refrigeration solution may be taken from the high-pressure side of the solution pump, reduced in pressure substantially by flow through a flow-resistance device which preferably, also functions as a heat exchanger to the ambient, and flowed vertically upwardly into an inverted U-tube vertical leg of increased flow capability. Alternately, the bleed fraction may be derived from the concentrated refrigeration solution flow being returned to the absorber element by gravity flow. After the upwardly moving liquid flows to the other vertical leg of the inverted U-tube it separates periodically into spaced-apart "slugs" of liquid which begin to flow downwardly by gravitational force and through a special V-configured entrapment chamber. Unwanted, non-condensible gases flowed from the system absorber element through a purge tube and into the V-configured chamber are periodically entrapped by downwardly-falling "slugs" of diluted refrigerant solution and are thus moved further-downwardly through the inverted U-tube by gravitational forces for compression and feed to the system solution pump inlet or to a liquid/gas separator with the solution returned to the system and the separated gases flowed to a storage chamber. In small-size absorption refrigeration systems the bleed dilute solution flow may typically be approximately 5% of system full dilute solution flow and adequate non-condensible gas compression may be developed typically in an inverted U-tube leg of approximately 3 foot height. Non-condensible gases thus purged from the system absorber element by the novel positive-displacement pump with no moving parts are flowed along with the bleed refrigeration solution through the solution pump element for elevation to the apparatus high-pressure generator element side. Subsequently the non-condensible gases are separated from the refrigerant solution in the system generator and continuously conducted to a storage chamber for accumulation and periodic venting to the atmosphere using an included valve and vent that may be manually or automatically activated. If automatic venting is preferred, the valve means is normally controlled to an open or closed condition in response to a sensed temperature condition in the non-condensible gas storage chamber.

DETAILED DESCRIPTION

Figure 1:
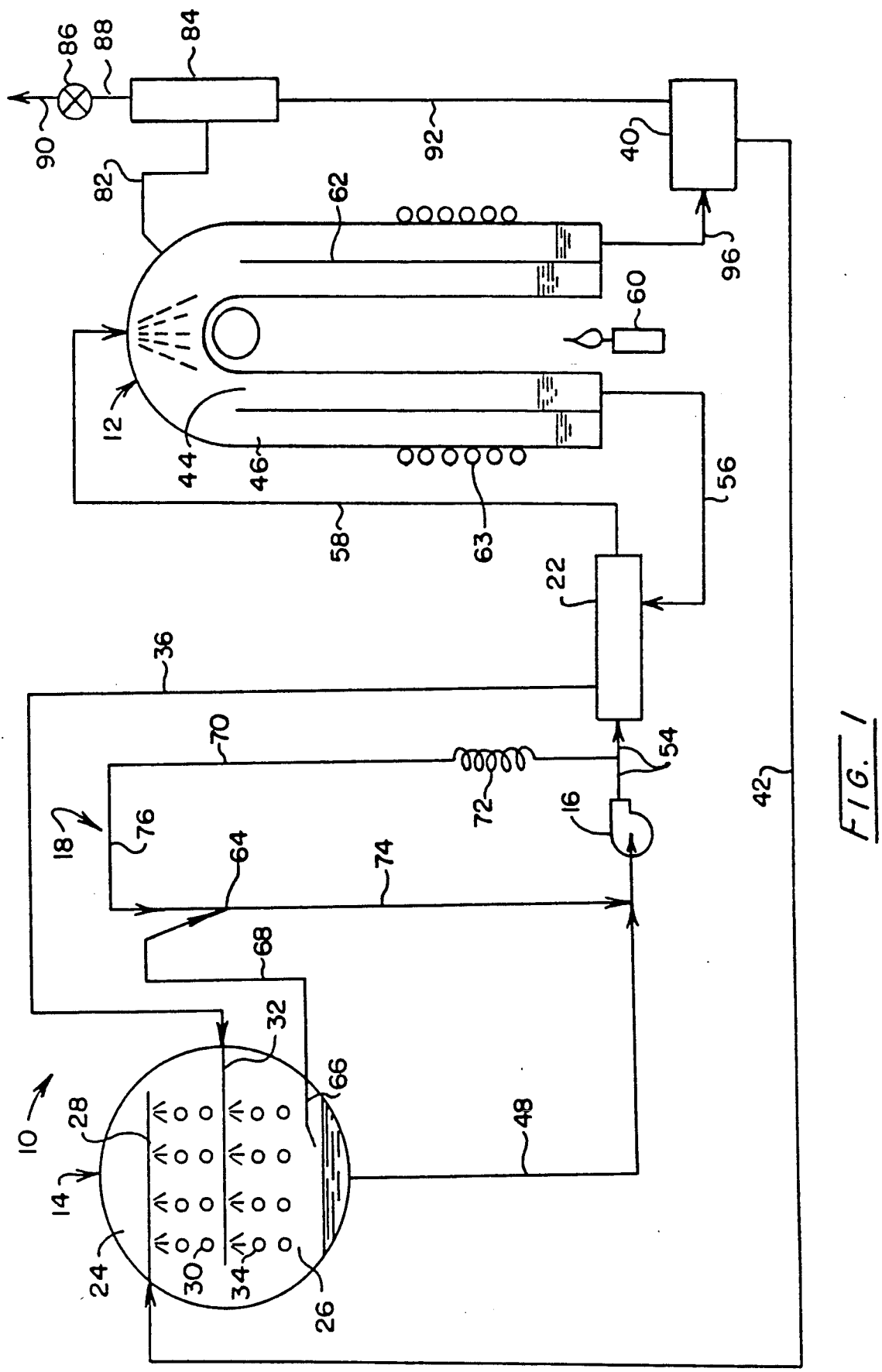
FIG. 1 is a schematic elevational diagram, partly in section, of an absorption refrigeration system having a preferred embodiment of the purge pump apparatus of this invention.

FIG. 1 schematically illustrates an assembled absorption refrigeration system 10 which includes a preferred embodiment of the purge pump apparatus of this invention. The principal subassemblies of system 10 include generator/condenser sub-assembly 12, evaporator/absorber sub-assembly 14, and a refrigeration solution pump sub-assembly 16. Other elements included in system 10 include purge pump 18 which functions essentially as a low-pressure-differential, positive-displacement pump, an absorber section liquid sump 20, a liquid-to-liquid heat exchanger 22, and various fluid lines interconnecting assemblies 12 through 22 in fluid flow relationship in the manner shown.

Basically, system 10 is a sub-atmospheric type absorption refrigeration system utilizing water vapor as the system refrigerant and a water and lithium bromide solution as the system solution. Sub-assembly 14 has an evaporator section 24, an absorber section 26, and typically may operate at an internal minimum sub-atmospheric pressure of as low as approximately 5–10 millimeters of mercury (0.1 psia). Liquid refrigerant (water) is introduced into section 24 through tube 28 in heat transfer relation to load heat exchanger 30 for evaporation. Evaporated liquid refrigerant is then mass-transferred in assembly 14 via absorber section 26 into combination with relatively concentrated refrigerant solution sprayed into absorber section 26 through spray tube 32 Additional cooling load heat is transferred from the system 10 load into the absorber section refrigerant and liquid refrigerant solution combination through additional load heat exchanger coils or tubes 34. In the FIG. 1 arrangement, relatively concentrated solution is flowed to spray tube 32 from liquid-to-liquid counterflow heat exchanger 22 through flow line element 36. Liquid refrigerant is flowed to spray tube 28 from refrigerant collector 40 through flow line 42 or from a tube-type condenser.

Subassembly 12 is preferably comprised of a generally annular generator section 44 and an adjoining generally annular condenser section 46. Relatively dilute solution collected in the lower portion of absorber section 26 is flowed through line segment 48 to the inlet of solution pump 16 at the system low side sub-atmospheric pressure level (e.g., 5–10 mm. Hg). After the relatively dilute solution has been pumped to the system high-side pressure level (e.g., 45 psia) by pump means 16, it is flowed through line segments 54 to counterflow heat exchanger 22 so as to cool concentrated solution transferred from generator section 44 by way of flow line segment 56. The relatively dilute solution heated in heat exchanger assembly 22 is flowed through line segment 58 to be sprayed at the upper inlet opening of subassembly 12 over the innermost interior surface of annular generator section 44 for evaporation by heat obtained from heat source 60 during dilute refrigerant solution gravity flow. Refrigerant vapors produced in annular generator section 44 pass over the end of cylindrical divider wall 62 and are condensed by heat transfer to a stream of coolant flowed through condenser coil 63 as liquid refrigerant (water) in condenser section 46 for accumulation at the lower extremity of section 46. The so-condensed liquid refrigerant is then flowed through line segment 96 and collected in collector subassembly 40 for subsequent flow to evaporator section 24 through line segment 42.

It is well known that unwanted and so called non-condensible gases (e.g., nitrogen, hydrogen, etc.) which exist is an absorption refrigeration system normally accumulate in the system absorber section 26, and if not preferably continuously or at least intermittently purged from that section during system operation will cause system refrigeration performance degradation or impairment. To overcome such a system operating impairment, I provide a system low-pressure-differential positive displacement pump assembly 18 which has no moving parts.

The function of pump means 18 is to flow accumulated, unwanted, non-condensible gases received from absorber section 26 through purge tube 66 and flow line segment 68 to the inlet of solution pump means 16 by way of connected line segment 74. Such is normally accomplished with an accompanying flow of mixed excess refrigerant vapor.

Figure 2:
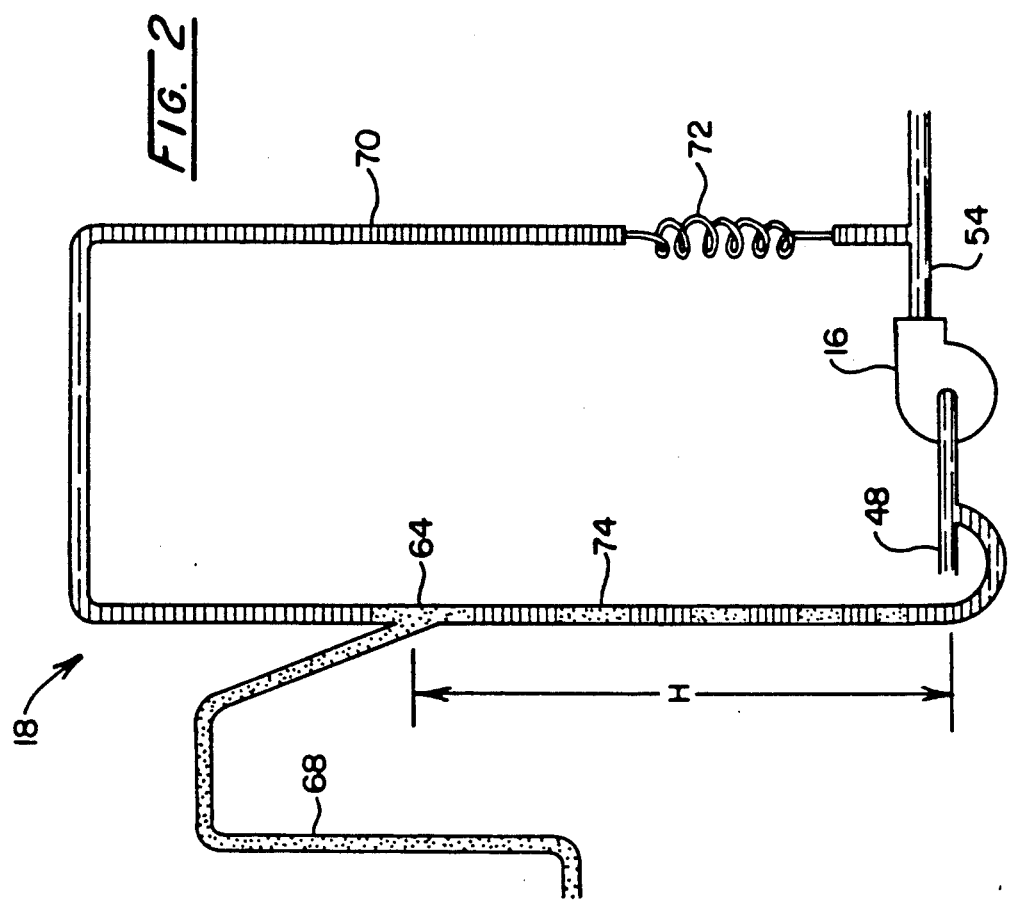
FIG. 2 is a partially sectioned schematic view of the pump apparatus of the FIG. 1 system for the continuous low-pressure-differential, positive-displacement pumping of unwanted non-condensible gases to the system solution pump inlet.

Referring to the embodiment of pump means 18 in FIG. 2, purged gases flowed into V-shaped entrapment zone 64 through line segment 68 are received at a pressure which is reduced relative to the absorber sub-atmospheric operating pressure and which is produced by the functioning of inverted U-tube 70–76 and the liquid/gas content therein bled from flow line 54.

In the operation of positive-displacement pump apparatus 18, approximately 1% to 5% maximum of the flow of dilute refrigeration solution flowed by solution pump 16 is taken from flow line 54 and flowed through flow-restrictor device 72 or a functional equivalent such as a fixed or variable orifice assembly or a variable flow control valve. In one instance, device 72 had the form of a coil tube of $\frac{1}{8}''$ I.D. copper tubing to thereby provide the device with a desired heat exchange capability relative to the ambient atmosphere. Typically, the bleed flow through device 72 and vertical leg 70 of apparatus element 18 is selected so that the fluid pressure in the inverted U-tube at cross-over leg 76 is very nearly equal to the sub-atmospheric operating pressure of absorber section 26 and the flow rate is so-controlled that fluid passing through cross-over leg 76 begins to separate as it enters downwardly into vertical leg 74 not as a "trickle"0 and not as full flow but in periodic "slugs" of dilute refrigeration solution separated by "slugs" of separated gases and refrigeration vapor otherwise entrained in the bleed solution. As the intermittently produced, spaced-apart "slugs" of liquid and gases pass downwardly through V-shaped entrapment zone 64 un-wanted, non-condensed gases flowed through purge lines 66 and 68 are entrapped in the zone void and moved downwardly from zone 64 through vertical leg 74 to flow line 48 and the inlet of solution pump 16 by the gravitational downward flow of dilute refrigeration solution. With the proper selection of a bleed solution flow rate and the height H of FIG. 2, such "slugs" of gases which include the entrapped, un-wanted, non-condensed gases are gradually compressed by the positive-displacement pumping action of pump apparatus 18 for feed into line 48 and the inlet of solution pump 16. In one actual embodiment of pump means 18 a height H of approximately 3 feet was found to be satisfactory for a bleed solution flow rate of approximately 0.04 gallons per minute.

System 10 also includes means for subsequently isolating and separating the unwanted gases from refrigerant and refrigerant solution of the system high side operating pressure and for venting the separated unwanted gases from the system to the atmosphere which generally is about 15 psia. That means basically comprises isolation line segment 82, collector element 84, vent valve 86 and vent lines 88, 90.

Collector 84 may be constructed as an integral part of collector 40 or, if separate, may be connected to collector tube 40 by separate line segment 92. The inlet opening for isolation tube 82 preferably communicates with the uppermost interior region of generator/condenser assembly 12 to receive separated un-wanted non-condensibles, and is positioned to intercept a minimum of any refrigerant vapor, or more importantly, liquid refrigeration solution flowed from the outlet of line segment 58.

Figure 3:
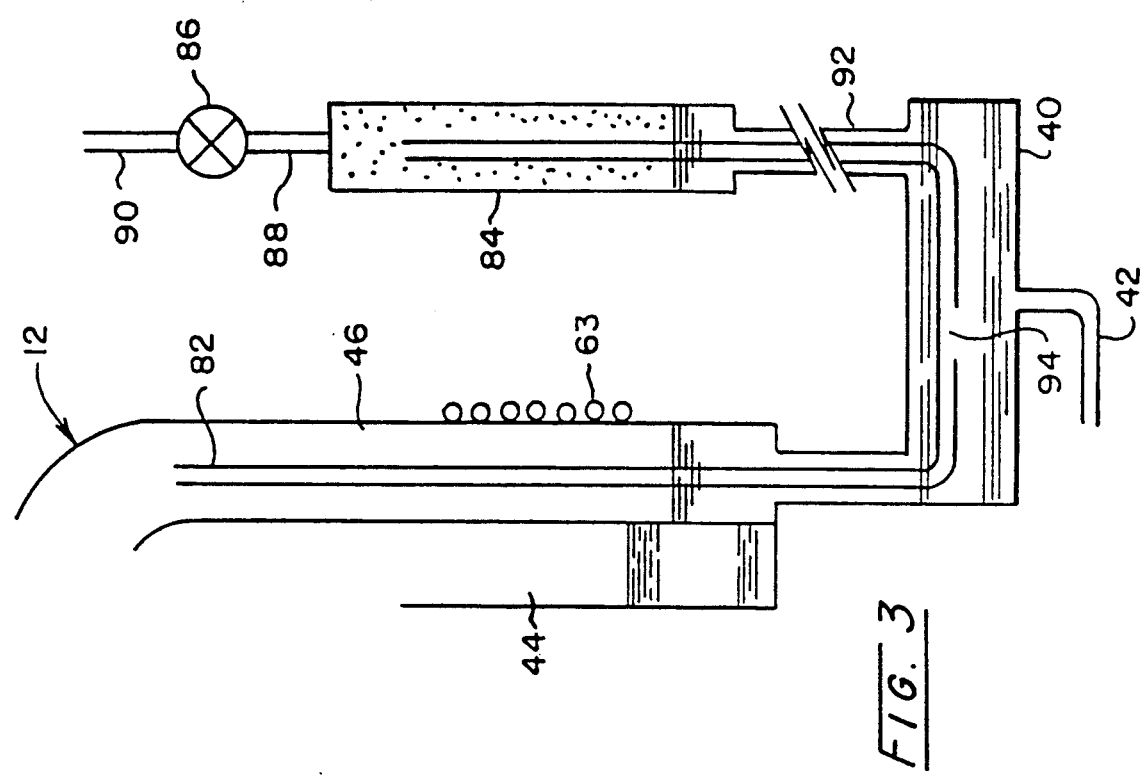
FIG. 3 is an enlarged sectional elevational view of a portion of the schematic illustration of FIG. 1 showing a preferred arrangement for separating unwanted non-condensible gases from system refrigeration solution constituents at system high side pressures for accumulation and periodic venting from the system to the atmosphere.

One particular embodiment of the combination of elements 82, collector(s) 40, 84, and vent apparatus 86-90 is illustrated schematically in FIG. 3. In the FIG. 3 arrangement flow line 82 takes the form of an inverted, generally U-shaped tube contained interiorly of condenser section 46 and collectors 40 and 84, and arranged to have its inlet and outlet openings located near the upper extremes of the interior chambers of condenser section 46 and collector 84, respectively. The lower portion of U-shaped tube 82 is provided with drain opening 94 which permits any refrigerant vapors condensed in the vertical legs of tube 82 to drain into the liquid refrigerant accumulated in collector 40 for return to evaporator section 24 of assembly 14. Alternatively, tube 82 might be made to pass from condenser section 46 to collector 84 directly in the manner suggested by the schematic illustration of FIG. 1.

Unwanted non-condensible gases accumulated in the upper region of collector 84 may be periodically vented to the atmosphere by actuation of conventional valve means 86 either manually or automatically. If accomplished automatically, opening and closing of valve means 86 is preferably made responsive to a sensed temperature condition within collector 84 and indicative of the level of the interface between accumulated non-condensible gases and accumulated liquid refrigerant.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and appended claims.

I claim:

1. In an absorption refrigeration system having absorber, generator, and refrigeration solution pump elements, purge pump apparatus comprising, in combination,
   a.) fluid flow resistance means receiving relatively dilute bleed refrigeration solution from the high-pressure side of said system solution pump element and substantially reducing the pressure of said reduced pressure dilute bleed refrigeration solution;
   b.) inverted, U-tube means connected to receive reduced pressure dilute bleed refrigeration solution from said fluid flow resistance means and having upward and downward vertical flow legs connected by a cross-over leg and an entrapment zone positioned in said downward flow vertical leg at an elevation below said cross-over leg; and
   c.) purge line means flowing un-wanted, non-condensed gases from said system absorber element to said U-tube means downward flow leg entrapment zone, said un-wanted, non-condensed gases being flowed downwardly in said U-tube downward flow leg toward as spaced-apart gas increments separated by dilute refrigeration solution increments for compression by gravitational forces and for delivery to the inlet of said system solution pump element.

2. The invention defined by claim 1 wherein said bleed dilute refrigeration solution flow comprises approximately from 1% to 5% of the total flow of dilute refrigeration solution by said system solution pump element.

3. The invention defined by claim 1 wherein said inverted U-tube means entrapment zone is positioned at an elevations sufficiently below the elevation of said cross-over leg cause the flow of dilute refrigeration solution to form space-apart solution increments at elevations above said entrapment zone.

4. The invention defined by claim 3 wherein said U-tube means entrapment zone is positioned at an elevation sufficiently above the elevation of said system solution pump element whereby gravitational forces acting on said solution increments cause entrapped un-wanted, non-condensed gas increments in said U-tube means downward vertical leg to become substantially compressed before reaching said system pump element.

* * * * *